Dec. 4, 1934.     J. C. BUTNER     1,983,067

EGG FORK

Filed April 24, 1934

Inventor
J. C. Butner
By Watson E. Coleman
Attorney

Patented Dec. 4, 1934

1,983,067

UNITED STATES PATENT OFFICE 1,983,067

EGG FORK

James Clair Butner, Petaluma, Calif.

Application April 24, 1934, Serial No. 722,210

3 Claims. (Cl. 294—26)

This invention relates to the class of article handling devices and pertains particularly to an egg handling fork.

The primary object of the present invention is to provide an improved type of fork for handling eggs in batches of three dozen at a time with ease and with the minimum risk of marking or damaging the eggs or disturbing the egg fillers.

Another object of the invention is to provide a novel type of egg fork having a handle disposed above and in a position over the fork whereby the fork may be used over a considerable period of time without fatigue to the user.

The invention will be best understood from a consideration of the following detailed description taken in connection with the accompanying drawing forming part of this specification, with the understanding, however, that the invention is not confined to any strict conformity with the showing of the drawing but may be changed or modified so long as such changes or modifications mark no material departure from the salient features of the invention as expressed in the appended claims.

In the drawing:—

Figure 1:
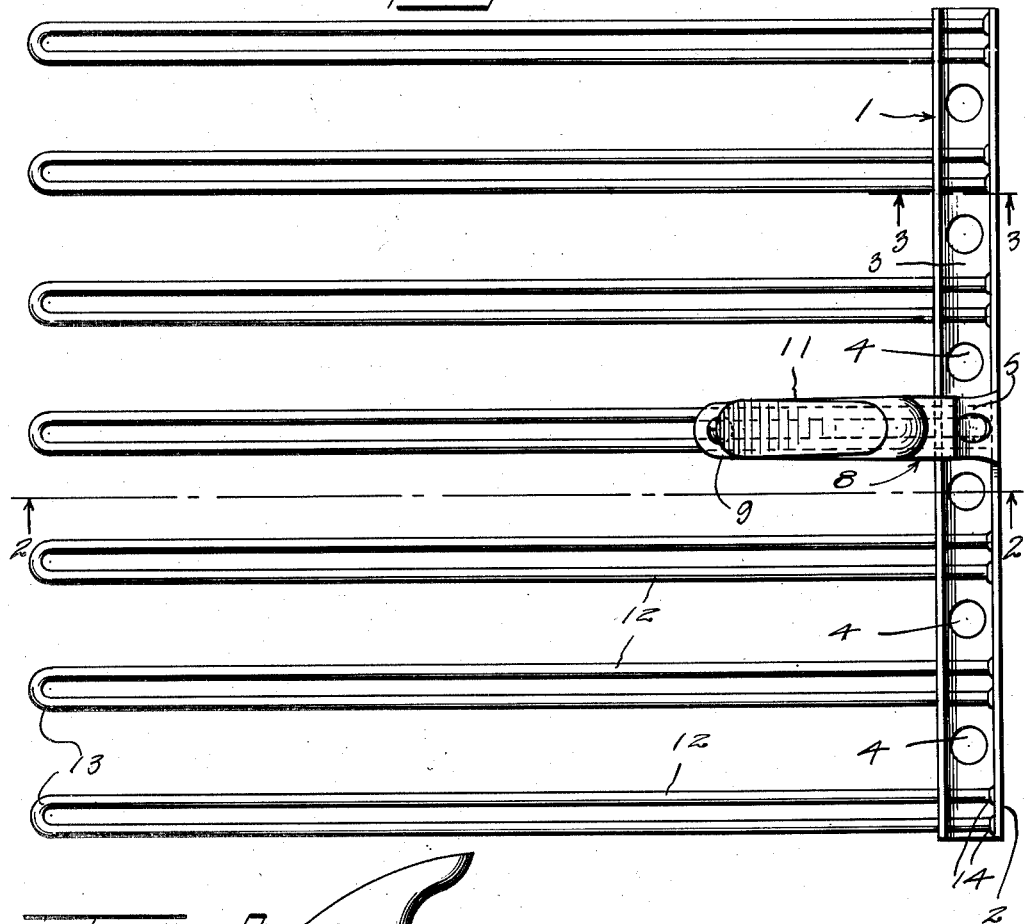
Figure 1 represents a top plan view of the fork embodying the present invention.

Referring to the drawing wherein like numerals of reference designate corresponding parts throughout the several views, the fork comprises a back bar which is indicated generally by the numeral 1 and which is preferably formed of channel material the flanges 2 of which are directed upwardly. For the purpose of lightening the construction, the web portion 3 of the channel bar is provided with a series of apertures 4. At the transverse center of the bar 1, there extends upwardly the forwardly curving arm 5 which has a vertical terminal portion 6 which is disposed substantially directly above the opposite flange from which the arm 5 extends.

Figure 2:
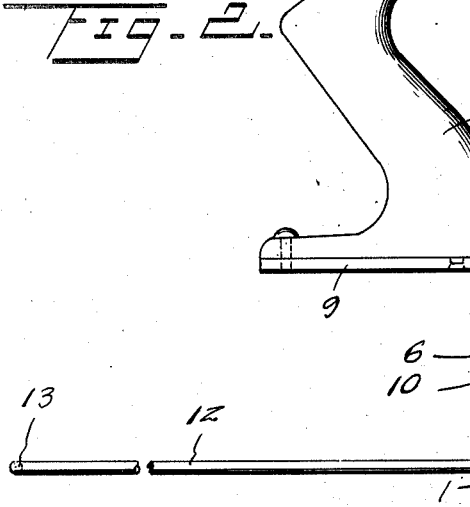
Figure 2 is a sectional view taken upon the line 2—2 of Figure 1, the central portion of the tines being broken away and showing a portion of the handle bracket in section.

Attached to the vertical portion 6 of the arm 5 is one arm 7 of the angle bracket which is indicated as a whole by the numeral 8, the other arm 9 being horizontally disposed as illustrated in Figure 2. The connection between the arm 7 and the portion 6 of the fixed arm 5 is maintained by a screw 10 which is of a character which will permit the bracket 8 to be oscillated to one side or folded down, when the screw is loosened. The horizontal arm portion 9 of the bracket 8 carries a handle 11 which is of the type commonly employed upon carpenters' planes.

Figure 3:
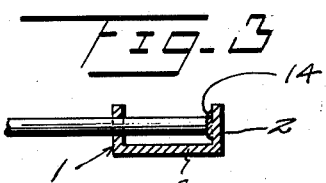
Figure 3 is an enlarged detail section taken on the line 3—3 of Figure 1.
Figure 3:

Extending at right angles to the bar 1 are a series of tines which are indicated by the numeral 12. Each of these tines 12 is made up of a rod or bar of metal which is bent upon itself intermediate its ends as indicated at 13 so that each tine comprises two spaced parallel members, the free ends of which pass through one flange 2 of the channel bar 1 and abut and are welded to the opposite channel as indicated by the numeral 14 in Figure 3. The bracket 8 has the handle carrying portion 9 extended over the tines so that the fork maintains a balance when in use and thus to a considerable extent, relieves strain upon the muscles of the user's hand, thus making it possible for one to use the fork for a longer period of time than other types of handling forks may be used.

The tines 12 are preferably formed of bars or rods of high carbon steel. This material is preferred to ordinary mild steel for the reason that it will not mark or discolor the eggs and also for the reason that the tines will yield or spring when coming into contact with extra large or odd shaped eggs without checking or cracking the eggs.

With a fork of the character herein set forth, a large number of eggs may be readily handled without damage and without disturbing the egg fillers as the rounded ends of the tines may be readily inserted between the fillers and the eggs located upon adjacent tines and readily lifted from one position to another.

What is claimed is:—

1. An egg fork, comprising a bar of channel formation, a plurality of tines extending from one side of the bar and each at one end passing through one flange of the channel bar and having connection with the other flange, an arm secured to said channel bar and extending upwardly therefrom, an angle bracket having two portions one of which is secured to said arm to extend vertically while the other portion extends horizontally over the tines, and a hand grip mounted upon the said other portion of the angle bracket.

2. An egg fork, comprising a channel bar, a plurality of tines each comprising a rod of metal bent intermediate its ends to bring the said ends into relatively close relation and form each tine with two spaced portions, the said adjacent two ends of each tine being extended through one of the two flanges of the channel bar and being secured to the other flange, a hand grip, and means connecting the hand grip with the channel bar at its transverse center whereby the hand grip is disposed in a plane above and over the tines.

3. A fork of the character described, comprising an elongated bar member, a plurality of tines extending from and at right angles to said bar, a bracket member integral with the bar midway of its ends and extending upwardly therefrom, a second bracket having a horizontal portion and a vertical portion, said vertical portion of the second bracket being in abutting relation with the upstanding portion of the first bracket and the horizontal portion of the second bracket extending inwardly over the tines, a pivot element passing through the first bracket and the vertical portion of the second bracket and pivotally connecting the same together to permit the second bracket to oscillate on an axis extending longitudinally of the tines, and a handle element mounted upon the horizontal portion of the second bracket to be oscillated laterally and downwardly toward the tines.

JAMES CLAIR BUTNER.